United States Patent [19]

Matsushita et al.

[11] Patent Number: 4,918,126

[45] Date of Patent: Apr. 17, 1990

[54] SILICONE RUBBER ADHESIVE FILMS WITH IMPROVED ADHESION

[75] Inventors: Takao Matsushita; Kanzuo Hirai, both of Chiba Prefecture, Japan

[73] Assignee: Toray Silicone Company, Ltd., Tokyo, Japan

[21] Appl. No.: 299,297

[22] Filed: Jan. 23, 1989

[30] Foreign Application Priority Data

Feb. 1, 1988 [JP] Japan .................................. 63-21721

[51] Int. Cl.$^4$ ................................................ C08K 5/54
[52] U.S. Cl. .......................................... 524/188; 524/262; 524/265; 524/267; 524/268; 524/493; 524/731
[58] Field of Search ............... 524/188, 262, 265, 268, 524/267, 493, 731

[56] References Cited

U.S. PATENT DOCUMENTS 4,344,800  8/1982  Lutz ................................. 106/308 Q
4,418,165  11/1983  Polmanteer et al. ................. 532/210
4,454,288  6/1984  Lee et al. ............................ 524/588

FOREIGN PATENT DOCUMENTS 225580  10/1987  Japan .

*Primary Examiner*—Melvyn I. Marquis
*Attorney, Agent, or Firm*—Roger H. Borrousch

[57] ABSTRACT

Silicone rubber adhesive films or sheets are obtained by sheeting a composition comprising 100 parts by weight of organopolysiloxane gum, 30 to 150 parts by weight of wet-process hydrophobic reinforcing silica, a curing agent, and 0.1 to 10 parts by weight of an organoalkoxysilane. These uncured sheets have a tensile strength at break of from 1.5 to 5 kg/cm$^2$. The adhesive films are characterized by simplicity in handling and an excellent workability combined with excellent tensile adhesive strength. They tightly bond and unify adherend pairs and are particularly suitable for bonding flat surface, such as fabrics, glass, and rubber sheets.

14 Claims, No Drawings

SILICONE RUBBER ADHESIVE FILMS WITH IMPROVED ADHESION

BACKGROUND OF THE INVENTION

1. Technical Field

The present invention relates to a film-form silicone rubber adhesive.

2. Prior Art

Because silicone rubber adhesives have an excellent heat resistance, durability, weathering resistance, etc., they are widely used in service which requires such characteristics. However, these silicone rubber adhesives are fluid pastes, and this places time requirements on the coating operation when used on substrates which have flat surfaces and large surface areas, for example, textiles, glasses and rubber sheets, etc. Furthermore, it is also difficult to obtain a constant coating thickness. In the field of the silicone rubber adhesives adapted to the adhesion of such substrates, Japanese Patent Application Laid Open [Kokai] No. 62-225580 [225,580/87] proposes a roll-wound adhesive in which a silicone rubber adhesive is laminated on a release substrate.

Problems to Be Solved by the Invention

However, it is difficult to manufacture this roll-wound adhesive in a thin film format due to the low tensile strength of the uncured silicone rubber composition. Also, its shape is subject to variation during application, and it must be handled with the aid of the release substrate layer in order to prevent tearing, and these factors serve to disadvantage the bonding operation. The inventors previously found that silicone rubber adhesive films could be made by sheeting a composition comprising 100 parts by weight of organopolysiloxane gum, 30 to 150 parts by weight of wet-method hydrophobic reinforcing silica, and a curing agent. These uncured sheets exhibited a tensile strength at break of from 1.5 to 5.0 kg/cm$^2$. These adhesive films are characterized by simplicity in handling and an excellent workability. Although these adhesive films can be used to tightly bond and unify adherend pairs, their tensile adhesive strength is less than desired for many applications. These silicone rubber adhesive films are claimed in copending application Ser. No. 278,118, filed Nov. 30, 1988, and assigned to the same assignee as the present application. This application is hereby incorporated by reference.

The inventors carried out investigations in order to solve these problems and found as a result that a silicone rubber composition obtained using a special wet-method silica and a special organoalkoxysilane has an excellent tensile strength when uncured, can be manufactured in a thin film format, and also gives an excellent bonding performance. The present invention is based on this finding. Wet-process silicas and compositions made from these wet-process silicas are described by Polmanteer et al in U.S. Pat. No. 4,418,165, issued Nov. 29, 1983, in which optically clear silicone compositions are described, but do not teach sheeting the compositions into uncured adhesive films.

Lutz in U.S. Pat. No. 4,344,800, issued Aug. 17, 1982, teaches methods of making hydrophobic reinforcing silica fillers and the fillers obtained by this wet method. Lutz is hereby incorporated by reference to show such silicas and the method of preparing them. Lee et al in U.S. Pat. No. 4,454,288, issued June 12, 1984, teach a method of treating silica, and some compositions in which the silica is used, however, Lee et al do not teach silicone rubber compositions in the form of uncured adhesive sheets.

SUMMARY OF THE INVENTION

The present invention has as its object the introduction of a film-form silicone rubber adhesive which offers simplicity in handling and thus an excellent workability as well as an excellent bonding performance, and in particular the introduction of a film-form silicone rubber adhesive which can tightly bond and unify various types of adherend pairs with level surfaces, such as textiles, glasses, and rubber sheets, etc.

Means Solving the Problems and Function Thereof

This invention relates to a silicone rubber adhesive film prepared from a silicone rubber composition which has as its principal components (A) 100 parts by weight organopolysiloxane gum having the average unit formula

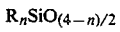
$$R_n SiO_{(4-n)/2}$$

in the formula, R is a substituted or unsubstituted monovalent hydrocarbon group and n=1.9 to 2.1, (B) 30 to 150 parts by weight wet-method hydrophobic reinforcing silica having a specific surface area of at least 200 m$^2$/g and composed of SiO$_2$ units and organosiloxane units selected from the group comprising R$_3$SiO$_{1/2}$ units, R$_2$SiO units, RSiO$_{3/2}$ units, and mixtures thereof, where each R in the formulas is defined as above, with the proviso that the organosiloxane unit to SiO$_2$ unit molar ratio is 0.08 to 2.0, (C) curing agent, in a quantity sufficient to cure the composition of the present invention, and (D) 0.1 to 10 parts by weight organoalkoxysilane or the partial hydrolysis condensate of such an organoalkoxysilane having at least one functional group selected from the group consisting of mercapto group, amino group, alkenyl group, methacryloxy group, and acryloxy group, wherein the tensile strength at break of said silicone rubber composition when uncured is in the range of 1.5 kg/cm$^2$ to 5.0 kg/cm$^2$ at 25 degrees Centigrade.

DESCRIPTION OF THE PREFERRED EMBODIMENTS

To explain the present invention in greater detail, the group R in the above formula for the organopolysiloxane gum of component (A) is a substituted or unsubstituted monovalent hydrocarbon group as exemplified by alkyl groups such as methyl, ethyl, propyl, etc.; alkenyl groups such as vinyl, allyl, etc.; cycloalkyl groups such as cyclohexyl, etc.; aralkyl groups such as beta-phenylethyl, etc.; aryl groups such as phenyl, etc.; and halogenated alkyl groups such as 3,3,3-trifluoropropyl, etc. While n in the above formula may have a value of 1.9 to 2.1, n=2, i.e., a diorganopolysiloxane gum, is preferred. The molecular weight of this diorganopolysiloxane gum is not specifically restricted, and compounds useful in this regard are those typically falling within the range encompassed by the designation, "organopolysiloxane gums", in this art. In general, use will be made of compounds having a viscosity of at least 10$^7$ centistokes at 25 degrees Centigrade, with average molecular weights of at least 25×10$^4$ and preferably at least 40×10$^4$. Furthermore, the organic groups in the organopolysiloxane comprising component (A) are not specifically restricted to within the range for R as given above. However, when the curing agent of component (C) consists of only a platinum compound without the use of an organoperoxide, it will then be necessary for component (A) to be a diorganopolysiloxane having at least 2 alkenyl groups in each molecule.

The component (B) used by the present invention, a wet-method hydrophobic reinforcing silica, is an essential component which characterizes the resent invention. It functions to improve the tensile strength at break of the uncured silicone rubber adhesive of the present invention, as well as, to promote its bonding performance.

Component (B) is a wet-method hydrophobic reinforcing silica constituted of the $SiO_2$ unit and organosiloxane units selected from the group comprising $R_3SiO_{\frac{1}{2}}$ unit, $R_2SiO$ unit, $RSiO_{3/2}$ unit, and mixtures thereof wherein each R in the formulas is as defined above. The quantity of organosiloxane units should be sufficient to make the surface of the reinforcing silica hydrophobic, and the organosiloxane unit/$SiO_2$ unit molar ratio should fall within the range of 0.08 to 2.0 and preferably within the range of 0.08 to 1.5. The bonding performance declines when this molar ratio falls below 0.08, and plasticization reversion phenomena also readily arise: when stored for long periods of time after preparation, the product becomes unusually hard and fissuring occurs, causing a decline in storage stability. On the other hand, when a value of 2.0 is exceeded, the reinforcing character declines so precipitously that the primary function as a reinforcing silica can no longer be fulfilled. Furthermore, with regard to its morphology, specific surface areas of at least 200 $m^2/g$ and preferably of at least 300 $m^2/g$ are preferred in order to obtain silicone rubber adhesives with elevated mechanical strengths.

Component (B) is to be added at 30 to 150 parts by weight and preferably 40 to 100 parts by weight per 100 parts by weight components (A).

Component (B) can be obtained, for example, by the methods disclosed in U.S. Pat. No. 4,418,165 and Japanese Patent Publication No. 61-56255 [56,255/86].

The curing agent of component (C) used in the present invention is a catalyst which acts to cause the curing of the composition of the present invention. Organoperoxide alone, the combination of an organoperoxide and a platinum compound, or a platinum compound alone can be used here. However, the use of only a platinum compound imposes a restriction on the organic groups in the organopolysiloxane of component (A). Furthermore, it must be noted that SiH-containing organohydrogenpolysiloxane also becomes necessary as a component of the curing agent as a crosslinking agent for component (A).

Organoperoxides as component (C) are exemplified by
dicumyl peroxide,
di-tert-butyl peroxide,
tert-butyl cumyl peroxide,
2,5-dimethyl-2,5-di(tert-butylperoxy)hexane,
2,5-dimethyl-2,5-di(tert-butylperoxy)hexyne,
1,1-bis(tert-butylperoxy)-3,3,5-trimethylcyclohexane,
benzoyl peroxide, and
2,4-dichlorobenzoyl peroxide.

Platinum compounds in component (C) are exemplified by chloroplatinic acid, acid, alcohol-modified chloroplatinic acid, platinum chelate compounds, chloroparticulate acid/olefin coordination compounds, and microparticulate platinum adsorbed over a carbon powder carrier.

Component (C) is to be added in a quantity sufficient to cure the composition of the present invention. This will fall within the range of 0.1 to 10 parts by weight for organoperoxides, and within the range of 0.1 to 300 parts by weight for each 1,000,000 parts by weight of the total quantity of components (A) and (B) in the case of platinum compounds.

Component (D) used by the present invention functions to promote the adhesive or bonding performance of the film-form silicone rubber adhesive of the present invention and to impart adhesiveness and particularly a durable adhesion for thermally cured silicone rubber bonding diverse substrates.

Component (D) is exemplified by the following organoalkoxysilanes:
gamma-mercaptopropyltrimethoxysilane,
gamma-mercaptopropylmethyldimethoxysilane,
gamma-(2-aminoethyl)-aminopropyltrimethoxysilane,
gamma-(2-aminoethyl)-aminopropylmethyldimethoxysilane,
gamma-anilinopropyltrimethoxysilane,
gamma-methacryloxypropyltrimethoxysilane,
gamma-acryloxypropyltrimethoxysilane,
vinyltri(methoxyethoxy)silane,
allyltrimethoxysilane, and
the partial hydrolyzates of the preceding.

Component (D) is compounded with components (A), (B), and (C) within a range to provide 0.1 to 10 parts by weight per 100 parts by weight component (A).

The film-form silicone rubber adhesive of the present invention is prepared from a silicone rubber composition having the above components (A) through (D) as its principal components. In more concrete terms, such silicone rubber compositions comprise organoperoxide-curing silicone rubber compositions and addition reaction-curing silicone rubber compositions. Typical examples of the former silicone rubber compositions are silicone rubber compositions consisting of the mixture of a diorganopolysiloxane gum, component (A), the wet-method hydrophobic reinforcing silica, component (B), as component (C), an organoperoxide, and an organoalkoxysilane as described for component (D), as well as, silicone rubber compositions prepared by compounding with other ingredients such as, a plasticizer such as hydroxyl-terminated dimethylsiloxane or diphenylsilanediol, etc., as an additional component into such mixtures.

For organoperoxide cured compositions, component (A) can be diorganopolysiloxane gums illustrated by trimethylsiloxy-terminated, or dimethylvinylsiloxy-terminated, or methylphenylvinylsiloxy-terminated, or silanol-terminated dimethylpolysiloxane gums, dimethylsiloxane-methylphenylsiloxane copolymer gums, dimethylsiloxane-diphenylsiloxane copolymer gums, and dimethylsiloxane-methylvinylsiloxane copolymer gums.

In typical examples of the platinum catalyzed silicone rubber compositions are those containing, SiH-containing organohydrogenpolysiloxane as a crosslinker component which is compounded into a mixture of diorganopolysiloxane gum, component (A) which contains the alkenyl group, for example, vinyl, etc., the wet-method hydrophobic reinforcing silica, component (B), a platinum compound, component (C), and an organoalkoxysilane, component (D).

The SiH-containing organohydrogenpolysiloxane cited here, as part of component (C), is exemplified by trimethylsiloxy-terminated methylhydrogenpolysiloxanes, trimethylsiloxy-terminated dimethylsiloxane-methylhydrognesiloxane copolymers, dimethylphenylsiloxy-terminated methylphenylsiloxane-methylhydrogensiloxane copolymers, methylhydrogenpolysiloxane cyclics, and copolymers consisting of dimethylhydrogensiloxane units and the $SiO_{4/2}$ unit.

The silicone rubber composition used by the present invention can be obtained by blending the specified quantities of components (A) through (D) as discussed above and kneading with, for example, a two-roll mill, kneader, Banbury mixer, etc. Furthermore, as long as the object of the present invention is not compromised, the various additives known in the art may also be compounded, for example, heat stabilizing additives such as titanium oxide, iron oxide red, cerium oxide, and barium zirconate; flame retardants such as halogen compounds and antimony oxide, and physical property modifiers such as silanes or polysiloxanes, etc.

It is essential to the present invention that the tensile strength at break of the uncured silicone rubber composition at 25 degrees Centigrade be within the range of 1.5 kg/cm$^2$ to 5.0 kg/cm$^2$, and values of 2.0 kg/cm$^2$ to 4.0 kg/cm$^2$ are preferred. When the tensile strength at break falls below 1.5 kg/cm$^2$, tearing and shape deformation will occur during handling. On the other hand, at values in excess of 5.0 kg/cm$^2$, while handling is in fact quite easy, plasticization reversion appears during storage of the silicone rubber composition, with excessive hardening and a loss of plasticity, and finally a tendency to fissuring. Within the context of the present invention, the tensile strength at break of the uncured silicone rubber composition is the value measured according to JIS K 6301.

In is important in the present invention that the thickness of the film-form silicone rubber adhesive by uniform. The thickness preferably falls within the range of 0.01 to 10 mm and more preferably within the range of 0.05 to 5 mm. When the thickness falls below 0.01 mm, the process of forming the silicone rubber composition into a film tends to become difficult. The thickness of the silicone rubber adhesive is too large at values in excess of 10 mm, which leads after curing to the appearance of problems such as a large creep, as well as, a reduced bonding strength due to stress concentration in the adhesion interface.

The adhesive film or sheet of the present invention is readily manufactured by extruding the silicone rubber composition as described above into film form using an extruder equipped with a die having the prescribed design. Also, the silicone rubber composition may be converted into a film using a calendar roll with film take off.

With regard to the actual application of the film-form silicone rubber adhesive of the present invention, it will be advantageous to punch it out and bond it in the shape of the substrate's adhesion region. For example, two types of substrates can be bonded into a single element by placing the film-form silicone rubber adhesive, punched out into the shape of the substrate's adhesion zone, on the adhesion surface of a substrate, then overlaying the other substrate from above, and thermally curing this assembly under pressure (1 to 20 kg/cm$^2$).

EXAMPLES

The present invention will be explained in the following using illustrative examples which are present for illustration and should not be construed as limiting the present invention which is properly delineated in the claims. In the examples, parts=parts by weight and %=weight %, and the tensile strength at break of the uncured silicone rubber composition was measured by the following method.

Measurement of the Tensile Strength of the Uncured Silicone Rubber Composition The silicone rubber composition was sheeted (thickness=2 mm) on a two-roll mill, and a No. 3 dumbbell as stipulated in JIS K 6301 (Physical Test Methods for Vulcanized Rubber) was punched from this sheet. The tensile strength of this dumbbell was then measured, at break, in conformity with JIS K 6301. The measurements were taken at 25 degrees Centigrade.

REFERENCE EXAMPLE 1

Synthesis of Wet-Method Hydrophobic Reinforcing Silica 118 g methanol, 32 g concentrated aqueous ammonium hydroxide, and 41 g dimethyldimethoxysilane were charged to a glass reactor, and this was mixed to homogeneity using a magnetic stirrer. While vigorously stirring this mixture, 96 g methyl orthosilicate was then added at once. The reaction product became a gel after 10 seconds and stopped the stirrer. Allowing this to stand under seal at room temperature for 1 week afforded a dispersion of wet-method hydrophobic reinforcing silica. The methanol and ammonia gas were removed from this silica dispersion, and the BET surface area of the obtained wet-method hydrophobic reinforcing silica was measured: this was found to be a wet-method hydrophobic reinforcing silica with a specific surface area of 620 m$^2$/g.

REFERENCE EXAMPLE 2

Synthesis of Wet-Method Hydrophobic Reinforcing Silica

A hydrophobing agent was first synthesized according to the method described in Japanese Patent Publication No. 61-56255 [56,255/86].

Thus, 277 g octamethylcyclotetrasiloxane, 4.6 g 1,3,5,7-tetramethyl-1,3,5,7-tetravinylcyclotetrasiloxane, 517 g methyltrimethoxysilane, and 0.43 g potassium hydroxide as catalyst were reacted for approximately 2 hours at 105 degrees Centigrade in order to prepare a hydrophobing agent comprising a ring-opened and redistributed organopolysiloxane. The potassium hydroxide was neutralized with carbon dioxide. Analysis of the obtained organopolysiloxane confirmed it to be a linear organopolysiloxane containing 0.7 mole % methylvinylsiloxane groups.

Wet-method hydrophobic reinforcing silica was then synthesized as below using this hydrophobing agent.

Thus, 118 g methanol, 32 g concentrated aqueous ammonium hydroxide, and 39 g of the above hydrophobing agent were charged to a glass reactor, and this was mixed to homogeneity using a magnetic stirrer. While vigorously stirring this mixture, 96 g methyl orthosilicate was then added at once. The reaction product became a gel after 15 seconds and stopped the stirrer. Allowing this to stand and age under seal at room temperature for 1 week afforded a dispersion of wet-method hydrophobic reinforcing silica.

The methanol and ammonia gas were removed from this silica dispersion, and the BET surface area of the obtained wet-method hydrophobic reinforcing silica was measured: this was found to be a wet-method hydrophobic reinforcing silica with a specific surface area of 540 m$^2$/g.

EXAMPLE 1

250 Parts of the wet-method hydrophobic reinforcing silica dispersion (silica content=25%) obtained in Reference Example 1 was introduced into 100 parts dimethylvinylsiloxyterminated methylvinylpolysiloxane gum (99.84 mole % dimethylsiloxane units, 0.16 mole % methylvinylsiloxane units) in a kneader mixer, and this was mixed while removing the solvent at 90 degrees Centigrade. A silicone rubber base was prepared by completely removing the volatile components by mixing for an additional 2 hours at 180 degrees Centigrade. A silicone rubber composition was then prepared by adding 2.0 parts 2,5-dimethyl-2,5-di(t-butylperoxy)hexane (50% purity) and 1.0 part gamma-mercaptopropyltrimethoxysilane to 100 parts of this silicone rubber base and kneading to homogeneity. The obtained silicone rubber composition was extruded from an extruder through a nozzle with the appropriate shape to give a film, thus affording a film-form silicone rubber adhesive having a thickness of 0.5 mm and a width of 5 cm. The obtained silicone rubber composition was also sheeted (2 mm thickness) on a two-roll mill, and the tensile strength at break of this sheet was measured according to JIS K 6301: a value of 2.6 kg/cm$^2$ was obtained.

At the same time, a 5 cm-wide silicone-coated cloth tape was prepared: this consisted of a glass cloth (plain weave, thickness=0.5 mm, count=24×19/25 mm) coated with silicone rubber (thickness=0.8 mm) on both surfaces. The above film-form silicone rubber adhesive was placed between segments of this silicone-coated fabric tape. Placing this assembly between platens, thermal curing was carried out for 10 minutes at 170 degrees Centigrade/5 kg/cm$^2$. A value of 6.2 kg/cm was obtained for the tensile adhesive strength of the bonded region when measured according to the peeling test stipulated in JIS K 6301. For comparison, a film-form silicone rubber adhesive was prepared as above with the modification that the 1.0 part gammamercaptopropyltrimethoxysilane was omitted. A value of 4.5 kg/cm was obtained when its tensile adhesive strength was measured as described above.

In addition, a film-form silicone rubber rubber adhesive was also prepared as above, but using a commercially available dry-method silica (Aerosil 300 from Nippon Aerosil Kabushiki Kaisha) in place of the above wet-method hydrophobic silica. A value of 3.5 kg/cm was obtained when its tensile adhesiveness was measured as above.

EXAMPLE 2

A film-form silicone rubber adhesive was prepared as described in Example 1, with the modification that gamma-aminopropyltrimethoxysilane was used instead of the gamma-mercaptopropyltrimethoxysilane used in Example 1. A value of 6.0 kg/cm was obtained when the tensile adhesive strength of this film-form silicone rubber adhesive was measured as in Example 1.

EXAMPLE 3

300 Parts of the wet-method hydrophobic reinforcing silica dispersion (silica content=25%) prepared in Reference Example 2 was introduced in a kneader mixer into 100 parts dimethylvinylsiloxy-terminated dimethylsiloxanemethylvinylsiloxane copolymer gun (99.63 mole % dimethylsiloxane units and 0.37 mole % methylvinylsiloxane units), and this was mixed at 90 degrees Centigrade while removing the solvent. A silicone rubber base was prepared by completely removing the volatile components by heating this for an additional 2 hours at 180 degrees Centigrade. A silicone rubber composition was then prepared by blending and kneading the following to homogeneity into 100 parts of this silicone rubber base: 1.5 parts trimethylsiloxy-terminated methylhydrogensiloxanedimethylsiloxane copolymer (7 centistokes at 25 degrees Centigrade, silicon-bonded hydrogen atom content=1.5 weight %), chloroplatinic acid/methylvinylsiloxane complex in a quantity sufficient to provide 10 ppm as platinum, 100 ppm methyltris(methylisobutynoxy)silane, and 0.5 g of gamma-methacryloxypropyltrimethoxysilane and vinyltrimethoxysilane were used to make two composition. Respectively the values of 3.0 kg/cm$^2$ to 3.5 kg/cm$^2$ were obtained when the tensile strengths at break of the uncured silicone rubber compositions were measured.

Using a calendar roll, the silicone rubber composition was cut out into a film-form silicone rubber adhesive with a thickness of 0.2 mm, width of 2.5 cm, and length of 3 cm.

This film-form silicone rubber adhesive was then inserted between a glass plate (5 cm×5 cm×0.5 cm) and stainless steel (SUS304) plate (2.5 cm×6 cm×0.25 cm) to give an adhesion surface area of 2.5 cm×3 cm. Air bubbles between the adherents and silicone rubber adhesive were then removed in vacuo in a vacuum desiccator. The test specimen was subsequently placed between two platens: thermal curing for 10 minutes at 150 degrees Centigrade/10 kg/cm$^2$ afforded a test specimen in which the glass plate and stainless steel plate had been unified into a single body. The adhesive strength of this test specimen was measured according to JIS K 6850, and the measurement values reported to be 32 kg/cm$^2$ for gamma-methacryloxypropyltrimethoxysilane and 25 kg/cm$^2$ for vinyltrimethoxysilane.

Effects of the Invention

Because the film-form silicone rubber adhesive of the present invention is prepared from a silicone rubber composition with an uncured tensile strength (JIS K 6301) of 1.5 kg/cm$^2$ to 5.0 kg/cm$^2$ at 25 degrees Centigrade comprising components (A) through (D) and in particular containing a special wet-method hydrophobic reinforcing silica as component (B) and a special alkoxysilane or partial hydrolysis condensate thereof as component (D), it is characterized by simplicity in handling and an excellent workability, and in addition by an excellent adhesion for various substrates. Thus, when used on adherends having flat surfaces, such as textiles, glasses, rubber sheets, etc., a tight adhesion into a single body is obtained for the adherend pair.

That which is claimed is:

1. A silicone rubber adhesive film prepared from a silicone rubber composition which has as its principal components (A) 100 parts by weight organopolysiloxane gum having the average unit formula $$R_nSiO_{(4-n)/2}$$

in the formula, R is a substituted or unsubstituted monovalent hydrocarbon group and n=1.9 to 2.1, (B) 30 to 150 parts by weight wet-method hydrophobic reinforcing silica having a specific surface area of at least 200 m²/g and composed of $SiO_2$ units and organosiloxane units selected from the group comprising $R_3SiO_{\frac{1}{2}}$ units, $R_2SiO$ units, $RSiO_{3/2}$ units, and mixtures thereof, where each R in the formulas is defined as above, with the proviso that the organosiloxane unit to $SiO_2$ unit molar ration is 0.08 to 2.0, (C) curing agent, in a quantity sufficient to cure the composition of the present invention, and (D) 0.1 to 10 parts by weight organoalkoxysilane or the partial hydrolysis condensate of such an organoalkoxysilane having at least one functional group selected from the group consisting of mercapto group, amino group, alkenyl group, methacryloxy group, and acryloxy group, wherein the tensile strength at break of said silicone rubber composition when uncured is in the range of 1.5 kg/cm² to 5.0 kg/cm² at 25 degrees Centigrade.

2. The silicone rubber adhesive film in accordance with claim 1 in which the film has a thickness of from 0.1 to 10 mm.

3. The silicone rubber adhesive film in accordance with claim 2 in which the uncured sheet has a tensile strength at break in the range of from 2.0 to 4.0 kg/cm².

4. The silicone rubber adhesive film in accordance with claim 1 in which the organoalkoxysilane of (D) is gamma-mercaptopropyltrimethoxysilane.

5. The silicone rubber adhesive film in accordance with claim 2 in which the organoalkoxysilane of (D) is gamma-mercaptopropyltrimethoxysilane.

6. The silicone rubber adhesive film in accordance with claim 3 in which the organoalkoxysilane of (D) is gamma-mercaptopropyltrimethoxysilane.

7. The silicone rubber adhesive film in accordance with claim 1 in which the organoalkoxysilane of (D) is gamma-aminopropyltrimethoxysilane.

8. The silicone rubber adhesive film in accordance with claim 1 in which the organoalkoxysilane of (D) is vinyltrimethoxysilane.

9. The silicone rubber adhesive film in accordance with claim 2 in which the organoalkoxysilane of (D) is vinyltrimethoxysilane.

10. The silicone rubber adhesive film in accordance with claim 3 in which the organoalkoxysilane of (D) is vinyltrimethoxysilane.

11. The silicone rubber adhesive film in accordance with claim 1 in which the organoalkoxysilane of (D) is gamma-methacryloxypropyltrimethoxysilane.

12. The silicone rubber adhesive film in accordance with claim 2 in which the organoalkoxysilane of (D) is gamma-methacryloxypropyltrimethoxysilane.

13. The silicone rubber adhesive film in accordance with claim 3 in which the organoalkoxysilane of (D) is gamma-methacryloxypropyltrimethoxysilane.

14. The silicone rubber adhesive film in accordance with claim 13 in which the organopolysiloxane gum of (A) is dimethylvinylsiloxy-terminated polydiorganosiloxane having dimethylsiloxane units and methylvinylsiloxane units.

* * * * *